United States Patent
Tolvanen

(10) Patent No.: US 6,215,985 B1
(45) Date of Patent: Apr. 10, 2001

(54) MOBILE COMMUNICATOR

(75) Inventor: Mika Tolvanen, Turku (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/164,672

(22) Filed: Oct. 1, 1998

(30) Foreign Application Priority Data

Oct. 2, 1997 (FI) .................................................... 973869

(51) Int. Cl.[7] .................................................. H04B 1/38
(52) U.S. Cl. .......................... 455/90; 455/100; 455/575; 368/10
(58) Field of Search ........................... 455/90, 100, 351, 455/575; 379/433, 434; 368/10, 13

(56) References Cited

U.S. PATENT DOCUMENTS

| | | | |
|---|---|---|---|
| 4,847,818 | * 7/1989 | Olsen | 455/90 |
| 5,008,864 | * 4/1991 | Yoshitake | 368/10 |
| 5,170,494 | 12/1992 | Levanto | 455/90 |
| 5,189,632 | 2/1993 | Paajanen et al. | 364/705.05 |
| 5,214,309 | 5/1993 | Saarnimo | 257/712 |
| 5,214,623 | 5/1993 | Seager | 368/10 |
| 5,224,076 | 6/1993 | Thorp | 368/10 |
| 5,229,701 | 7/1993 | Leman et al. | 320/2 |
| 5,235,561 | 8/1993 | Seager | 368/10 |
| 5,253,146 | 10/1993 | Halttunen et al. | 361/784 |
| 5,260,915 | * 11/1993 | Houlihan | 368/10 |
| 5,265,158 | 11/1993 | Tattari | 379/433 |
| 5,271,056 | 12/1993 | Pesola et al. | 379/58 |
| 5,274,613 | 12/1993 | Seager | 368/13 |
| 5,313,661 | 5/1994 | Malmi et al. | 455/232.1 |
| 5,361,459 | 11/1994 | Hyvonen et al. | 24/35 |
| 5,499,292 | 3/1996 | Blonder et al. | 379/433 |
| 5,603,103 | 2/1997 | Halttunen et al. | 455/90 |
| 5,604,921 | 2/1997 | Alanara | 455/45 |
| 5,642,402 | 6/1997 | Vilmi et al. | 379/58 |
| 5,768,370 | 6/1998 | Maatta et al. | 379/433 |
| 5,779,115 | 7/1998 | Parkas et al. | 224/272 |
| 5,787,341 | 7/1998 | Parkas et al. | 455/90 |
| 5,809,115 | 9/1998 | Inkinen | 379/93.05 |
| 6,078,803 | * 6/2000 | Martinez | 455/90 |

FOREIGN PATENT DOCUMENTS 0 572 252 A1    12/1993  (EP) .
WO 94/13088     6/1994   (WO) .

* cited by examiner

*Primary Examiner*—Nay Maung
*Assistant Examiner*—Quochien B. Vuong
(74) *Attorney, Agent, or Firm*—Perman & Green, LLP

(57) ABSTRACT

A mobile communicator consisting of a wrist strap and an actual combined mobile communicator connected to the strap which includes at least two separate mobile communicator parts. The parts of the mobile communicator are mechanically connected by joints so that they can be folded inwardly against one another in repose position and can be opened profitably sequentially and in parallel when in a usage position. The mobile communicator parts are arranged to be opened outwardly for use in essentially a vertical direction compared with the plane of the wrist strap.

13 Claims, 2 Drawing Sheets

MOBILE COMMUNICATOR

BACKGROUND OF THE INVENTION

1. Field of the Invention

The present invention relates to a foldable mobile wrist communicator according to the preamble of the patent claim 1. Mobile communicator here means also wireless telephones on the whole.

2. Description of the Prior Art

The patent publication U.S. Pat. No. 5,274,613 presents a watch and a radio telephone mounting on a wrist strap. In the prior art solution a watch and a mobile radio communicator are located in a foldable unit, which can be attached to or disconnected from a wrist strap. The foldable unit is opened out so that the topmost part of the foldable unit pivots out to the left and the middle part to the right as seen from the left hand while the bottom part remains in its initial position. That is to say the foldable unit pivots out tangent to the wrist strap i.e. perpendicular to the arm line. When unfolded the unit functions as a radio telephone which has a microphone on one end and an earphone on the other end of the opened unit.

However, the prior art solution has its disadvantages. Whole electronics has been planned to be inserted in one wrist strappable unit. In this way the unit becomes large and heavy, which makes the usage of the unit on the wrist strap quite inconvenient. Especially the power unit solutions of the mobile communicators still today are of the size and weight class, which are very difficult to fit together with the unit in question. One notable disadvantage is also that because the current supply is fixed when the current supply runs low, the watch and the mobile communicator are out of order till the current supply has been charged again.

The radio mobile communicator of the prior art opens out to a very inconvenient position when it is used on the wrist. When the longitudinal direction is perpendicular to the longitudinal direction of the arm talking to the phone and other usage of the radio telephone is difficult because irrespective of whether the opened out mobile communicator is located inside or outside of the wrist the user must always hold his hand in an unnatural position as he speaks to the phone. In addition, when the watch and the radio telephone are combined it is impossible to use and carry them separately only one at a time.

SUMMARY OF THE INVENTION

The purpose of the present invention is to create a new mobile communicator by which the above mentioned problems can at least to a great extent be removed. In order to facilitate this the mobile communicator constructed in accordance with the principles of present invention is characterized by the preamble of the patent claim 1. Advantageous embodiments of the invention have been presented in other patent claims.

The present invention has an advantage that the mobile communicator folds out for use parallel to the arm. The unfolded mobile communicator can be used supported by the palm without removing it from the wrist strap. A solution like this improves operation comfortability and increases operation security of the mobile communicator.

One preferred mobile communicator constructed in accordance with the principles of present invention includes another device such as a watch or a television, which has been placed on the same wrist strap. Both devices can be separate units so it is possible to use them separately only one unit at a time, if required. In addition, two separate units arranged to the different sides of the wrist strap make a more balanced and convenient assembly to be worn on the wrist and used than a large combined unit on a wrist strap.

In one preferred mobile communicator constructed in accordance with the principles of present invention the problem of a heavy current supply has been solved using an annular current supply, which can also function as a wrist strap. In this way the weight is distributed especially evenly and both the mobile communicator and the other device can use the same current supply. In addition, when the current supply is exhausted it can be replaced by a charged one and the charged current supply can be used immediately without waiting for the first battery to be charged.

A mobile communicator in accordance with an embodiment of the present invention comprises a wrist strap and an actual mobile communicator connected to it, which has at least two mobile communicator parts, which have been mechanically united by joints so that they can be folded in against one another for a position of repose and can be opened outwardly for a position of use, characterized in that the parts of the mobile communicator are arranged to be opened for use in essentially vertical direction compared with the wrist strap plane.

BRIEF DESCRIPTION OF THE DRAWINGS

In the following preferred embodiment configurations of the invention are described in more detail using the accompanying drawings, in which.

DESCRIPTION OF THE PREFERRED EMBODIMENTS

Figure 1:
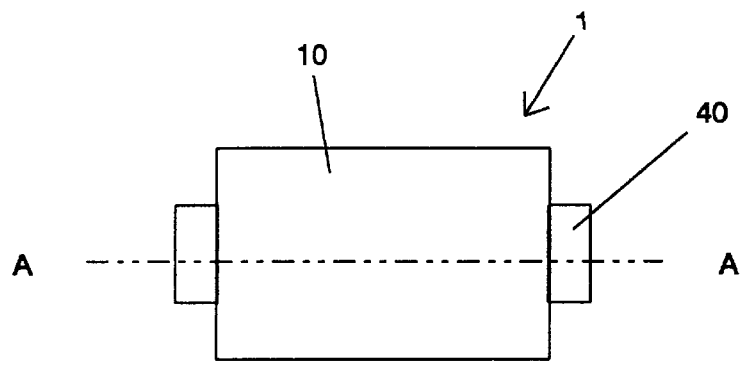
FIG. 1 shows a mobile communicator according to the invention in repose position.
Figure 2:
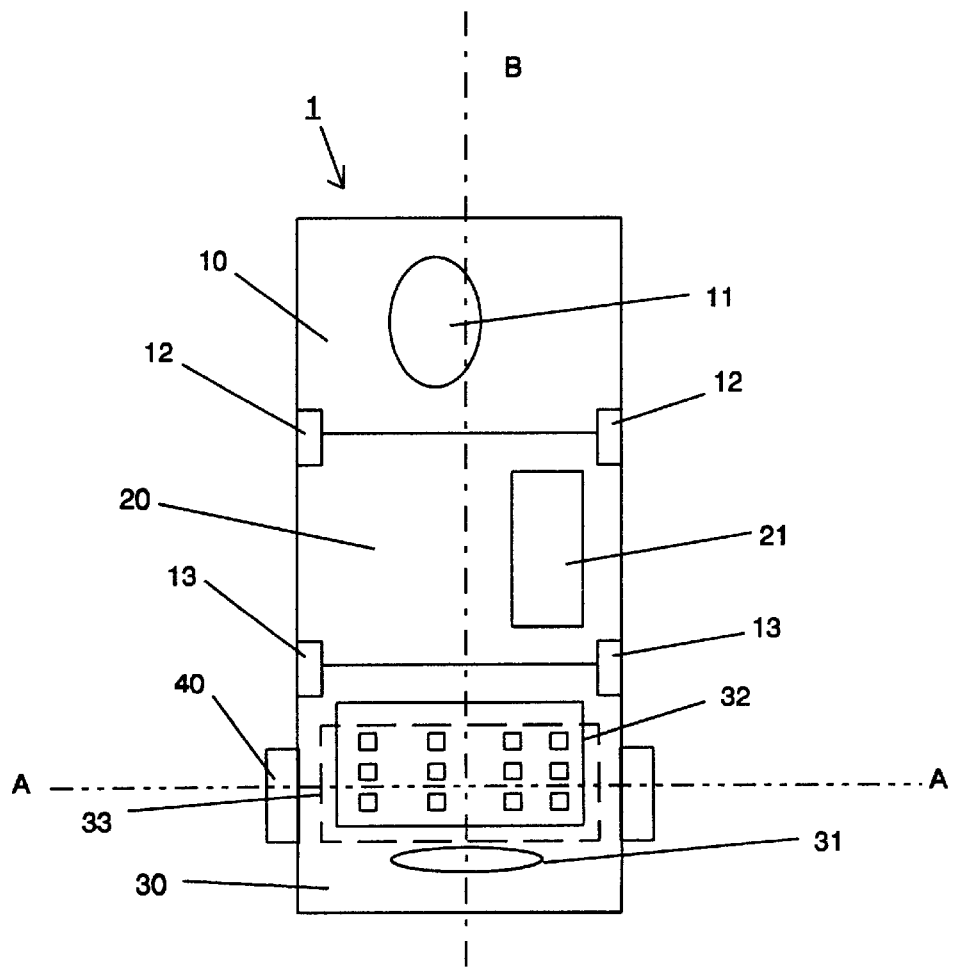
FIG. 2 shows the same mobile communicator in usage position.

A mobile communicator according to the invention consists of an actual mobile communicator 1, which has three parts 10, 20, 30 connected to each other by hinges 12, 13, and a wrist strap 40. The mobile communicator 1 is attached by one part, the third part 30, to the wrist strap 40. The parts 10, 20, 30 of the mobile communicator 1 are superimposed on one another by hinges 12, 13 or corresponding joints in repose position as can be seen in FIG. 1. The parts 10, 20, 30 of the mobile communicator 1 are arranged to be pivoted out for use in the substantially perpendicular direction B-B with respect to the plane A—A of the wrist strap 40 as illustrated in FIG. 2.

The parts 10, 20, 30 of the mobile communicator 1 are designed in this exemplary embodiment as essentially same sized rectangular parts with the electronics required by the mobile communicator built in. In one preferred embodiment configuration the largest part of the electronics such as the transmitter-receiver has been placed in the third part 30. In this way the first part 10 and the second part 20 can preferably be lightened and the load on hinges 12, 13 is diminished. Equally the need for transmission between parts 10, 20, 30 and the number of wires required are reduced. The microphone 31 and the earphone 11 of the mobile communicator are placed far away from each other e.g. so that the microphone 31 is mounted in the third part 30 and the earphone 11 in the first part 10. In this way enough space is created between the microphone 31 and the earphone 11 although the width of the folded mobile communicator 1 is rather small. In this case the display 21 of the mobile communicator 1 is located in another part 20. The keyboard 32 of the mobile communicator 1 can be placed e.g. in the third part 30. Electronics can also be placed in the wrist strap as well as in the parts mentioned.

Some user interface means, such as the display 21 and the keyboard 32, can be arranged to the mobile communicator 1 so that they are removeable and they can be turned by 180 degrees to a new position. This can be achieved by using e.g. rapid connectors. The possibility to turn the display 21 and the keyboard 32 is important in a case where the mobile communicator 1 is used on the other wrist. The display 21 and the keyboard 32 are thus arranged to be read and used from the direction perpendicular to the opening direction by turning the display 21 and the keyboard 32.

Figure 3:
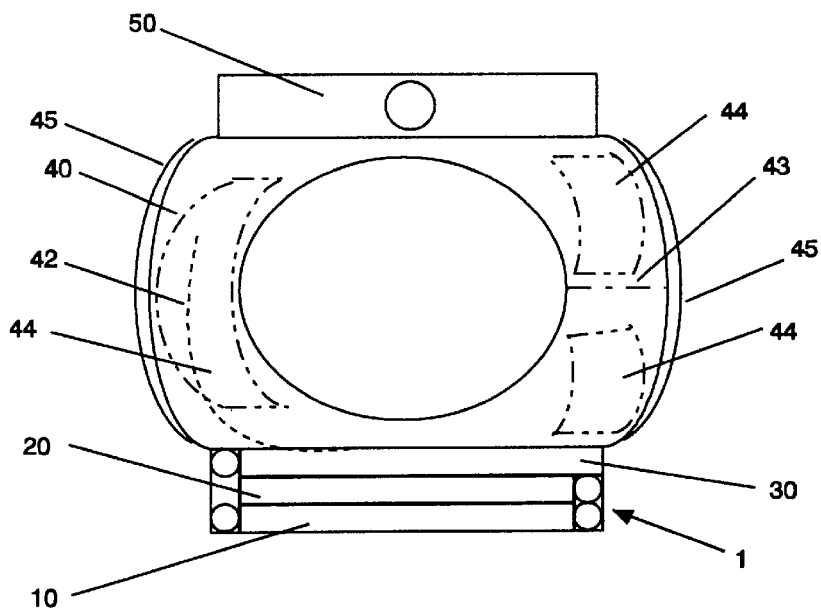
FIG. 3 shows another mobile communicator according to the invention seen from the side.

Another mobile communicator according to the invention is illustrated in FIG. 3. In principle, this mobile communicator is shown from the side with respect to the plane A—A. (cf. FIGS. 1 and 2). The mobile communicator consists of, in addition to the actual mobile communicator 1, a separate device 50, such as a watch. The mobile communicator 1 is shown folded in repose position in FIG. 3. The device 50 is attached to the opposite side of the wrist strap compared with the mobile communicator 1.

The current supply of the mobile communicator 1 and a possible other device 50 include a battery 44, which has its location in connection with the wrist strap 40. The battery 44 can be configured by placing one or several batteries into the wrist strap 40 or alternatively an annular battery can make up the wrist strap 40 itself. In both cases the weight of the mobile communicator 1 is distributed evenly around the wrist.

The wrist strap 40 or the battery 44, which generally belongs to the current supply, can also in an exemplary embodiment be accomplished by smaller battery cells connected serially by joints by which the parts of the wrist strap can easily be brought into an annular form suitable for wrist. The battery of the current supply can also be accomplished by amorphous or liquid material residing in the strap.

The wrist strap 40 can be opened and closed using the joint 43 in order to slip it on and/or out of one's wrist. In a preferred embodiment configuration also a solar cell 45 belongs to the current supply of the actual mobile communicator 1 and/or the watch 50 of the mobile communicator 1. The solar cell 45 is preferably attached onto the wrist strap 40 as illustrated in FIG. 3.

It is also possible to place parts which are used to control the current supply in connection to the wrist strap 40 and the battery 44 located in the strap, such parts like short-circuit or excess voltage protector or other parts which are substantial for controlling the charging or discharging of the battery or for other control. It is also possible to place other parts such as the antenna 42 in the wrist strap.

Figure 4:
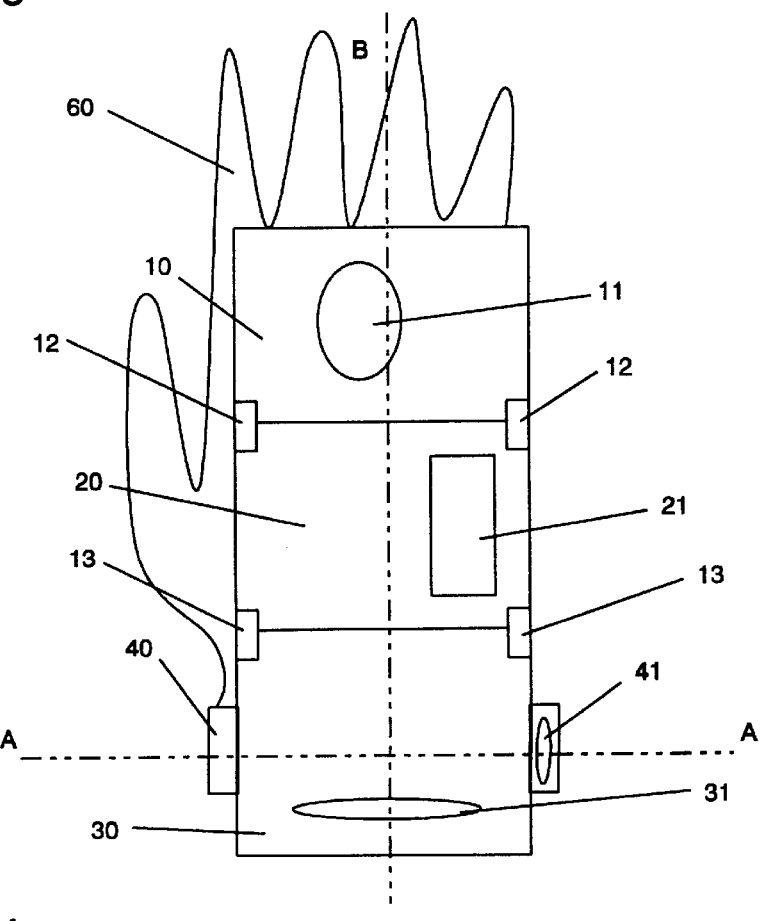
FIG. 4 shows a preferred way of using the mobile communicator according to the invention.

A preferred embodiment of the mobile communicator according to the invention is illustrated in FIG. 4. In this figure the first part 10 and the second part 20 of the actual mobile communicator 1 are opened out on the hinges 12,13 so that the parts are sequential and parallel to the same direction B—B. Because the opening direction of the mobile communicator is vertical to the plane A—A of the wrist strap 40, it means that the mobile communicator is placed in the direction of the palm and specifically on the palm so that a disconnection from the wrist strap 40 is not required for usage.

In one preferred embodiment of the mobile communicator 1 according to the invention the diplay 21 is a touch-screen display. In the mobile communicator 1 presented in FIG. 4 all the parts 10, 20, 30 can be touch-screen displays. The touch-screen can be of such type that data is input by writing with e.g. a pen-like device to the screen. The screen functions can be configured so that it is possible to recognize the user's hand-writing In another preferred embodiment of the invention the mobile communicator 1 is configured so that it is possible to couple hands-free equipment into it. Usually the hands-free equipment comprise at least the microphone and the earphone which are coupled to the mobile communicator with leads. The hands-free equipment is especially advantageous in an embodiment described above where all the parts 10, 20, 30 are displays 21. This way it is possible to handle call operations and data operations at the same time.

In a preferred embodiment modification the camera 41 has been connected to the mobile communicator according to the invention. The camera 41 can be connected to the third part 30 of the mobile communicator or to the wrist strap 40 as illustrated in FIG. 4. If the camera 41 is arranged to be in connection with the mobile communicator, the display 21 must be arranged so that i t c an also be used to show pictures which have enough resolution for visual communication being, possible with the mobile communicator.

Although the invention is described above by some embodiments it is not limited to them only but can be modified within the scope and the spirit of the invention and the patent claims below.

What is claimed is:

1. A mobile communicator comprising a wrist strap and an actual mobile communicator connected to, said strap which communicator has at least two mobile communicator parts, which have been mechanically united by joints so that they can be folded in against one another for a position of repose and can be opened outwardly for a position of use, characterized in that the parts of said mobile communicator are arranged to be opened for use in essentially a vertical direction compared with said wrist strap plane, one part of said mobile communicator having a fixed position in relation to said wrist strap and at least two of said parts positioned to be opened outwardly for said position of use.

2. The mobile communicator according to claim 1, characterized in that the parts of the mobile communicator can be opened sequentially and parallel in position of use.

3. The mobile communicator according to claim 1, characterized in that in addition to the actual combined mobile communicator another device belongs to the mobile communicator.

4. The mobile communicator according to claim 3, characterized in that the mobile communicator and said other device has been attached to different sides of said wrist strap.

5. The mobile communicator according to claim 3 characterized in that said other device is a watch.

6. The mobile communicator according to claim 3 characterized in that said other device is a television.

7. The mobile communicator according to claim 1, characterized in that a current supply of said mobile communicator comprises a battery which is placed within said wrist strap.

8. The mobile communicator according to claim 7, characterized in that an additional solar cell belongs to the current supply and the solar cell is preferably placed on outer surface of said wrist strap.

9. The mobile communicator according to claim 1, characterized in that a transmitter-receiver unit of the actual combined mobile communicator is placed in a mobile communicator part, which is directly connected to said wrist strap.

10. The mobile communicator according to claim 1, characterized in that said communicator comprises user intercase means that are arranged to be turned for usage of said mobile communicator on either wrist of a user.

11. The mobile communicator according to claim 1, characterized in that said mobile communicator comprises a touch-screen display.

12. The mobile communicator according to claim 1, characterized in that said mobile communicator comprises a camera.

13. The mobile communicator according to claim 1 characterized in that said two parts are opened in opposite directions.

\* \* \* \* \*